United States Patent
Hengstler et al.

(10) Patent No.: US 9,996,592 B2
(45) Date of Patent: Jun. 12, 2018

(54) QUERY RELATIONSHIP MANAGEMENT

(71) Applicants: Christian Hengstler, Dresden (DE); Stefan Hesse, Dresden (DE); Martin Rosjat, Dresden (DE); Volodymyr Vasyutynskyy, Dresden (DE)

(72) Inventors: Christian Hengstler, Dresden (DE); Stefan Hesse, Dresden (DE); Martin Rosjat, Dresden (DE); Volodymyr Vasyutynskyy, Dresden (DE)

(73) Assignee: SAP SE, Walldorf (DE)

( * ) Notice: Subject to any disclaimer, the term of this patent is extended or adjusted under 35 U.S.C. 154(b) by 525 days.

(21) Appl. No.: 14/264,942

(22) Filed: Apr. 29, 2014

(65) Prior Publication Data

US 2015/0310061 A1   Oct. 29, 2015

(51) Int. Cl.
*G06F 7/00* (2006.01)
*G06F 17/30* (2006.01)

(52) U.S. Cl.
CPC .............................. *G06F 17/30539* (2013.01)

(58) Field of Classification Search
None
See application file for complete search history.

(56) References Cited

U.S. PATENT DOCUMENTS

| | | | |
|---|---|---|---|
| 7,694,307 B2 | 4/2010 | Kraiss et al. | |
| 8,015,056 B1 | 9/2011 | Fenstermaker et al. | |
| 8,140,383 B2 | 3/2012 | Busch et al. | |
| 8,660,886 B1 | 2/2014 | Anderson et al. | |
| 8,683,370 B2 | 3/2014 | Bhavnani et al. | |
| 8,713,446 B2 | 4/2014 | Gottlieb et al. | |
| 8,767,019 B2 | 7/2014 | Heinrich et al. | |
| 2003/0204487 A1 | 10/2003 | Sssv et al. | |
| 2007/0094060 A1 | 4/2007 | Apps et al. | |
| 2009/0112932 A1 | 4/2009 | Skierkowski et al. | |
| 2009/0132304 A1 | 5/2009 | Krause et al. | |
| 2010/0057497 A1* | 3/2010 | Chamberlain | G06F 19/322 705/3 |
| 2011/0246415 A1* | 10/2011 | Li | G06F 17/30563 707/602 |
| 2011/0302220 A1* | 12/2011 | Marcella | G06F 17/30448 707/803 |
| 2012/0041910 A1 | 2/2012 | Ludik et al. | |
| 2013/0332241 A1 | 12/2013 | Taylor et al. | |
| 2013/0332472 A1 | 12/2013 | Vogel et al. | |

(Continued)

*Primary Examiner* — Thu Nga Nguyen
(74) *Attorney, Agent, or Firm* — Brake Hughes Bellermann LLP

(57) ABSTRACT

A query relationship data structure (RELSTRUCT) generator configured to select a plurality of queries, each query structured for application against a database to yield a query result. The RELSTRUCT generator includes a query analyzer configured to identify query parts of individual queries, and determine for each query, a relation, if any, of an included query part to any query part of remaining queries of the plurality of queries. The RELSTRUCT generator also may create, for each query, a query relationship data structure in which the query is related to at least one other query of the plurality of queries, based on the determined relation of a query part of the query and a query part of the at least one other query of the plurality of queries.

19 Claims, 11 Drawing Sheets

(56) References Cited

U.S. PATENT DOCUMENTS

| | | | |
|---|---|---|---|
| 2014/0095473 A1* | 4/2014 | Srinivasan | G06F 17/30442 707/718 |
| 2014/0244681 A1* | 8/2014 | Chikkam | G06F 17/30424 707/765 |
| 2014/0282053 A1 | 9/2014 | Hauschild et al. | |

* cited by examiner

QUERY RELATIONSHIP MANAGEMENT

TECHNICAL FIELD

This description relates to management of relationships between queries.

BACKGROUND

Successful businesses often rely on the gathering, interpretation, and analysis of business data. For example, businesses may use one or more databases to store customer data, transactional data, inventory data, financial data, or operational data related to operations of manufacturing, inventory, or shipping facilities. Then, by regularly applying queries against such data, businesses may obtain corresponding query results which provide valuable information to business leaders, to thereby assist the business leaders in making successful decisions with respect to future business operations.

As one example of such query results, a key performance indicator (KPI) generally refers to a single interpreted/calculated value that is obtained from a plurality of information items (e.g., data records) of the types of databases referenced above. For example, such KPIs may be used to describe a state or value of a dedicated object or other entity in a business context. By way of more specific example, KPIs may be related to an operation of a machine or class of machines, a stop of a production line, an efficiency of a supplier, or a duration of creation of a specified product. Thus, such KPIs, and other query results obtained from the types of databases referenced above, may provide fast and valuable insight with respect to specific, discrete operations of a business.

Because such KPIs and other query results may be highly useful, various different KPIs or other query results may be developed in specific business contexts. Then, the KPIs or other query results may be periodically recalculated to obtain a current status thereof, and may be provided to a user, e.g., in the context of a dashboard or other user interface.

However, when viewing such dashboards or other user interfaces, it may be difficult or impossible for a user to recognize interdependencies or other relationships between the displayed items. For example, in illustrative and non-limiting examples, KPIs may be created over a long period of time, and/or by various different users, so that it is difficult to tell, from viewing the KPIs, which underlying factors might influence one or more of the KPIs, or whether (or to what extent) a given KPI is related to another KPI. For these and other reasons, then, conventional systems do not make optimal use of available business data, or of interpreted/calculated values obtained therefrom.

SUMMARY

According to one general aspect, a system may include instructions recorded on a non-transitory computer-readable storage medium, and executable by at least one processor. The system may further include a query relationship data structure (RELSTRUCT) generator configured to cause the at least one processor to select a plurality of queries, each query structured for application against a database to yield a query result. The RELSTRUCT generator may include a query analyzer configured to cause the at least one processor to identify query parts of individual queries, and determine for each query, a relation, if any, of an included query part to any query part of remaining queries of the plurality of queries. The RELSTRUCT generator may be further configured to cause the at least one processor to create, for each query, a query relationship data structure in which the query is related to at least one other query of the plurality of queries, based on the determined relation of a query part of the query and a query part of the at least one other query of the plurality of queries, and store the query relationship data structures in a query relationship data structure (RELSTRUCT) repository.

According to another general aspect, a computer-implemented method for executing instructions stored on a non-transitory computer readable storage medium may include selecting a plurality of queries, each query structured for application against a database to yield a query result, identifying query parts of individual queries, determining for each query, a relation, if any, of an included query part to any query part of remaining queries of the plurality of queries. The method may further include creating, for each query, a query relationship data structure in which the query is related to at least one other query of the plurality of queries, based on the determined relation of a query part of the query and a query part of the at least one other query of the plurality of queries, and storing the query relationship data structures in a query relationship data structure (RELSTRUCT) repository.

According to another general aspect, a computer program product may be tangibly embodied on a non-transitory computer-readable storage medium and may include instructions that, when executed, are configured to select a plurality of queries, each query structured for application against a database to yield a query result, identify query parts of individual queries, and determine for each query, a relation, if any, of an included query part to any query part of remaining queries of the plurality of queries. The instructions, when executed, may be further configured to cause the at least one processor to create, for each query, a query relationship data structure in which the query is related to at least one other query of the plurality of queries, based on the determined relation of a query part of the query and a query part of the at least one other query of the plurality of queries, and store the query relationship data structures in a query relationship data structure (RELSTRUCT) repository.

The details of one or more implementations are set forth in the accompanying drawings and the description below. Other features will be apparent from the description and drawings, and from the claims.

DETAILED DESCRIPTION

Figure 1:
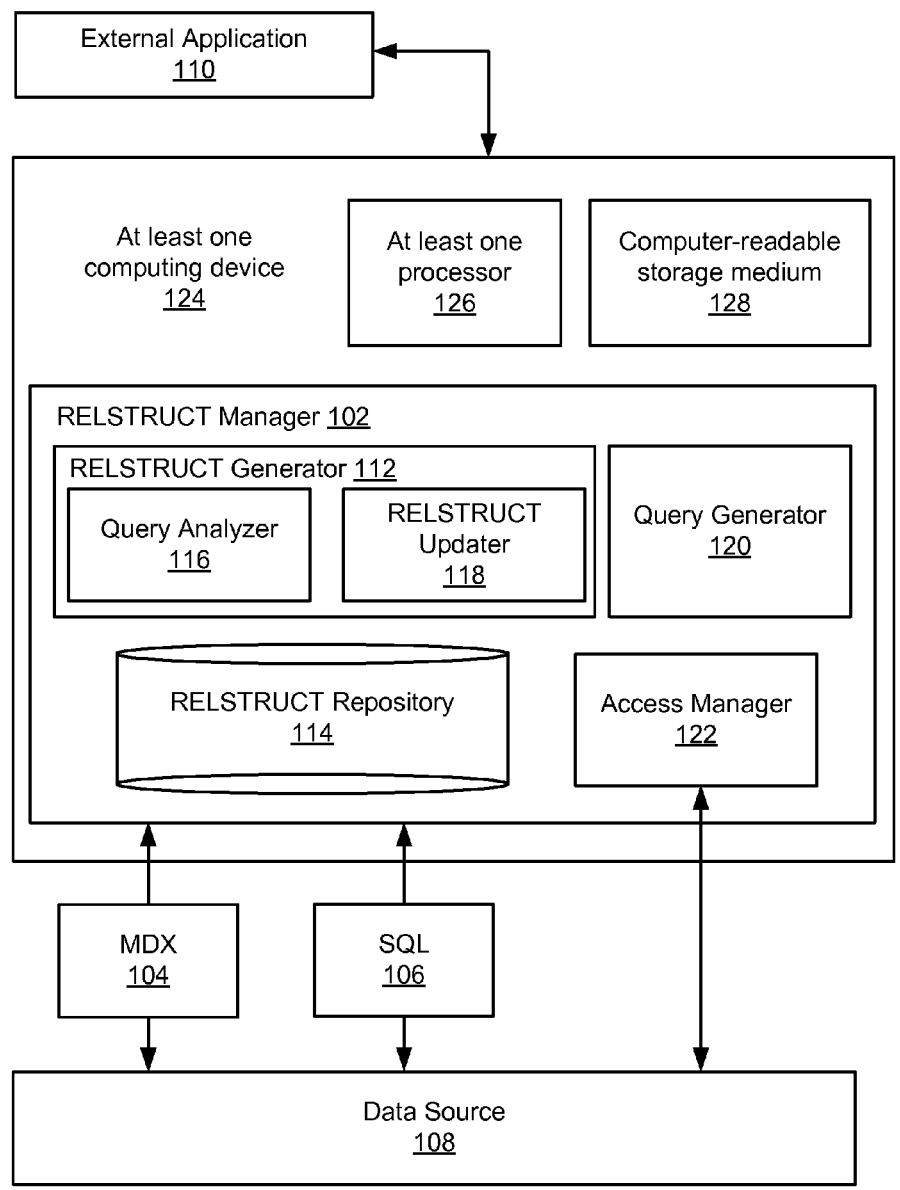
FIG. 1 is a block diagram of a system for management of query relationships.

FIG. 1 is a block diagram of a system 100 for management of query relationships. In the example of FIG. 1, a RELSTRUCT manager 102 manages application of queries, such as multi-dimensional (MDX) queries 104 and/or standard query language (SQL) queries 106, against a data source 108. In the nomenclature of FIG. 1, and in the following description, as described in detail herein, the term RELSTRUCT refers to one or more data structures designed to manage dependencies and other relationships between and among queries, such as the MDX queries 104 and/or the SQL queries 106. The RELSTRUCT thus provides a unified format for representing and otherwise managing relationships between queries, so that, for example, it becomes straightforward and convenient to illustrate or otherwise determine or explore new relationships between corresponding query results, such as, e.g., the KPIs referenced above. Moreover, the RELSTRUCT format makes it straightforward to update or otherwise modify queries, or to otherwise obtain new/modified query results. These and other features and advantages of the RELSTRUCT manager 102, and of the RELSTRUCT data format, are provided in more detail, below.

In the example of FIG. 1, the MDX queries 104 refer generally to queries written in the Multi-Dimensional eXpression query language, which is itself designed for querying multi-dimensionally modeled data. For example, an online analytical processing (OLAP) system may store data in data structures known as cubes or OLAP cubes, which, as the name implies, store data along three different axes or dimensions. More generally, the MDX queries 104 may be configured to access data that is stored in multi-dimensional data structures, or virtually any available dimension.

Meanwhile, the SQL queries 106 refer to queries written in the standard query language, commonly used to access relational databases. As both MDX and SQL queries, by themselves, are known, further description of the use of such queries, and/or related query types, is not provided herein, except as may be necessary or helpful in understanding example operations of the system 100 of FIG. 1.

As may be appreciated from the above discussion of the MDX queries 104 and the SQL queries 106, the data source 108 may represent any one or more databases that may appropriately be queried by the MDX queries 104 and/or the SQL queries 106. For example, as referenced above, the data source 108 may represent an OLAP system, that may be accessed by the MDX queries 104 to thereby provide a plurality of defined key performance indicators (KPIs). Meanwhile, in other example implementations, the SQL queries 106 may be used to query the data source 108 where the data source 108 represents, for example, a column/row relational database table that includes, for example, all the customers of a business.

Accordingly, just as the MDX queries 104, the SQL queries 106, and the data source 108 should be understood to broadly represent various types of queries and data that may be appropriate in specific business contexts, an external application 110 should similarly be understood to represent virtually any business application, or other application that may benefit from receiving query results against the data source 108.

In specific examples, as just referenced, and as described and illustrated in more detail below with respect to FIGS. 5-11, the external application 110 may be an application which utilizes a plurality of KPIs which are obtained through the analysis of OLAP cubes. For example, a number of business intelligence tools exist which are designed to analyze OLAP cubes to obtain desired KPIs. Of course, KPIs may be defined and calculated with respect to virtually any business application, such as, for example, enterprise resource planning applications, supply chain management applications, customer relationship management applications, inventory management applications, and/or warehouse management applications. Various types of other business or non-business software applications would be apparent, and should be understood to be represented by the example external application 110 of FIG. 1.

In the examples that follow, the RELSTRUCT manager 102 is discussed primarily with respect to examples involving the MDX queries 104, often with respect to calculation of KPI values. However, it will be apparent from the above discussion, and from FIG. 1, that similar techniques and operations may be utilized with respect to the SQL queries 106, or other query/data types. Moreover, in addition to the KPI calculations, the RELSTRUCT manager 102 may be used to manage query relationships for virtually any application that relies on, or utilizes, a set of queries that are regularly or repeatedly applied against one or more sets of data.

In the example of FIG. 1, then, as described in more detail below, the RELSTRUCT generator 112 may be configured to access and gather the MDX queries 104 from an available source of queries. The RELSTRUCT generator 112 may be further configured to analyze the gathered MDX queries 104, for transformation thereof into internal data structures representing query relationships, referred to herein as RELSTRUCTs. The resulting RELSTRUCTs may then be stored within a RELSTRUCT repository 114.

Thus, as illustrated in the example of FIG. 1, the RELSTRUCT generator 112 may include a query analyzer 116 that is configured to analyze the MDX queries 104, e.g., in order to determine the similarities between individual portions or parts of different queries of the MDX queries 104. For example, it may occur that the MDX queries 104 include a first query having three parts and a second query having four parts, where one query part is similar or identical within the two hypothetical queries. In such cases, the query analyzer 116 may determine that the two hypothetical queries are similar or otherwise related. More generally, the query analyzer 116 may compare query parts of all of the MDX queries 104 to one another, so as to thereby determine relationships and potential relationships between the queries as a whole.

Operations of the RELSTRUCT generator 112, and the included query analyzer 116, are described in more detail below, e.g., with respect to FIGS. 4-11. In general, however, it may be appreciated that in example implementations, the RELSTRUCT generator 112 operates to generate RELSTRUCTs in a 1:1 relationship with individual queries of the MDX queries 104, for subsequent storage of the resulting RELSTRUCT data structures within the RELSTRUCT repository 114. For example, a first query of the MDX queries 104 may be analyzed on the basis of its individual query parts against all other query parts of queries within the MDX queries 104, for associated generation of a first RELSTRUCT which represents and illustrates the determined relationships between the first query and one or more of the remaining MDX queries. Similarly, a second query would correspond to a second RELSTRUCT data structure, and so on for each of the MDX queries 104.

Thus, the RELSTRUCTs stored within the RELSTRUCT repository 114 represent data structures that include actual, live queries and/or query parts. Over time, it may be desirable or advantageous to modify or otherwise update such queries or query parts. Consequently, the RELSTRUCT generator 112 is illustrated as including a RELSTRUCT updater 118, which may be configured to update individual RELSTRUCTs within the RELSTRUCT repository 114, e.g., by replacing one or more query parts within a RELSTRUCT. Additionally, or alternatively, the RELSTRUCT updater 118 may be configured to update relationships from the perspective of an individual RELSTRUCT (e.g., may add a relationship between the RELSTRUCT in question and a newly-added query, or between the RELSTRUCT and an existing query, based on updated parameters for determining query relationships, or may re-parameterize or remove one or more query relationships included within the RELSTRUCT in question).

As referenced, the RELSTRUCT repository 114 is utilized to store RELSTRUCT data structures that include actual, live queries that may be applied against the data source 108. Over time, as also referenced, it may be desirable or advantageous to create new or modified queries, or to otherwise obtain new query results. For example, a user of the system 100 may wish to utilize a new KPI value. Consequently, a query generator 120 may be utilized to obtain desired query results, perhaps using one or more RELSTRUCTs, or persons thereof, from within the RELSTRUCT repository 114. In other words, instead of requiring the user to create an entirely new query for inclusion in the MDX queries 104, the query generator 120 may be able to provide the effect of a desired query and associated query result, using already-available query parts. Moreover, in such contexts, the resulting queries will easily be incorporated into the relationships and dependencies existing between the various RELSTRUCTs within the RELSTRUCT repository 114.

Thus, the query generator 120 may receive an input from a user, the input specifying desired query characteristics. The query generator 120 may thereafter analyze the RELSTRUCT repository 114 to generate the desired query, while, as described above, the RELSTRUCT updater 118 may be configured to update the RELSTRUCT repository 114 accordingly. Then, as shown, an access manager 122 may be configured to provide live access to the data source 108, using the thus-generated queries.

In more specific instances of the examples just given, as also referenced above, it may be appreciated that the query generator 120 need not generate a new query to be included within the MDX queries 104. Rather, as may be appreciated from the system 100 of FIG. 1, the query generator 120 may effectively reuse individual queries or query parts, stored within the RELSTRUCT repository 114, so as to obtain a new query result or type of query result. Thus, the access manager 122 provides live access to the data source 108, to thereby obtain, specific, desired query results, e.g., specific KPIs.

In the example of FIG. 1, the RELSTRUCT manager 102 is illustrated as being executed using at least one computing device 124. As shown, the at least one computing device 124 may include at least one processor 126, as well as a non-transitory computer readable storage medium 128. Of course, the at least one computing device 124 may be understood to represent virtually any implementation of one or more computing devices that may be used to execute the RELSTRUCT manager 102. As such, the at least one processor 126 may represent, for example, two or more processors executing in parallel, while the computer readable storage medium 128 may represent, for example, one or more memories used to store processor instructions and/or data. For example, the use of such memories may include storage of computer executable instructions for executing the RELSTRUCT manager 102, as well as one or more memories used to store the RELSTRUCTs of the RELSTRUCT repository 114. Of course, although not explicitly illustrated, the at least one computing device 124 may be appreciated to include various other conventional hardware/software components, as may be useful or necessary in implementing the system 100 of FIG. 1.

Similarly, although the RELSTRUCT manager 102 is illustrated as a single component executing on the at least one computing device 124, it may be appreciated that various components of the RELSTRUCT manager 102 may be executed using two or more computing devices, in communication with one another. More generally, it may be appreciated that any individual component of the RELSTRUCT manager 102 may be executed using two or more subcomponents, while, conversely, two or more components of the RELSTRUCT manager 102 may be combined for execution as a single component. Thus, as described above, and as described in more detail below, the RELSTRUCT manager 102 provides for techniques for obtaining uniformed, combined structural information for a plurality of multi-dimensional queries. Moreover, the RELSTRUCT manager 102 provides information regarding relationships between such multi-dimensional queries, which may be used in a plurality of different applications. Examples of such applications referenced above are provided in more detail below, but may include, for example, graph-based visualizations of query relationships, analysis of data of the data source 108, or the discovery of previously unknown dependencies or relationships between queries. Further, the RELSTRUCT manager 102 provides for ease of reuse of created RELSTRUCTs, thereby enabling creation of new RELSTRUCTs that are not necessarily based on an original MDX query directly, but rather is based on other, existing RELSTRUCTs, so that explicit creation of a new MDX query may not be required.

Figure 2:
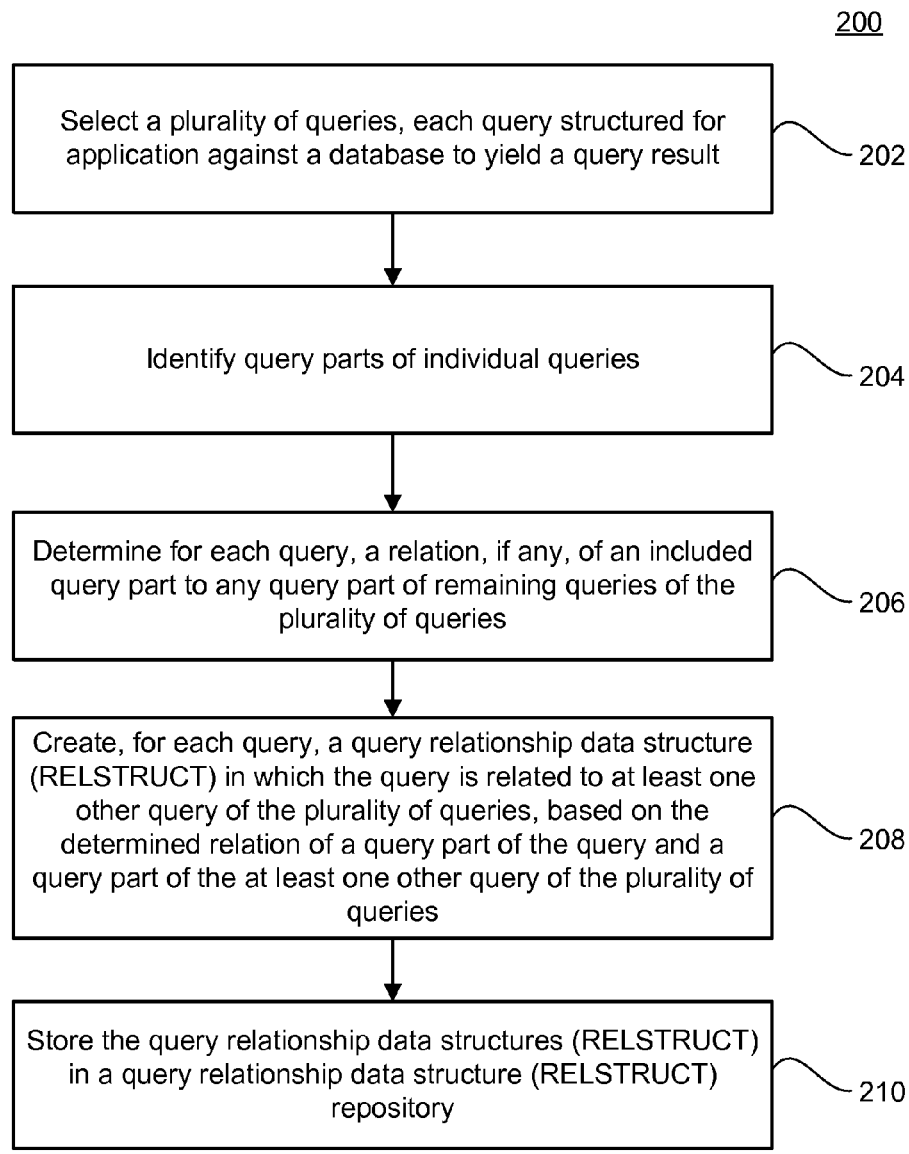
FIG. 2 is a flowchart illustrating example operations of the system of FIG. 1.

FIG. 2 is a flowchart 200 illustrating example operations of the system 100 of FIG. 1. In the example of FIG. 2, operations 202-210 are illustrated as separate, sequential operations. However, it may be appreciated, that, in various implementations, two or more of the operations 202-210 may be executed in a partially or completely overlapping or parallel manner, or in a branched, looped, iterative, or nested fashion. Additionally, or alternatively, although not explicitly illustrated, implementations may include additional or alternative operations, while, in other implementations, one or more operations may be omitted.

In the example of FIG. 2, a plurality of queries may be selected, each query structured for application against a database to yield a query result (202). For example, in the example of FIG. 1, the RELSTRUCT generator 112 of the RELSTRUCT manager 102 may select the MDX queries 104, which have been designed for application against the data source 108.

Query parts of individual queries may be identified (204). For example, the RELSTRUCT generator 112, e.g., the query analyzer 116, may identify individual query parts of each query of the MDX queries 104. Examples of individual query parts of a query are illustrated below, e.g., with respect to FIG. 3.

For each query, a relation (or multiple relations), if any, may be determined between an included query part and any query part of remaining queries of the plurality of queries (206). For example, the RELSTRUCT generator 112, e.g., the query analyzer 116, may determine a relation, such as a similarity or dependency, between a first query part of a selected query and any remaining query part of remaining ones of the MDX queries 104.

For each query of the plurality of queries, a query relationship data structure (RELSTRUCT) may be created, in which the query is related to at least one other query of the plurality of queries, based on the determined relation of the query part of the query and the query part of the at least one other query of the plurality of queries (208). For example, the RELSTRUCT generator 112 may create a plurality of RELSTRUCTs, corresponding to individual ones of the MDX queries 104.

The query relationship data structures (RELSTRUCTs) may be stored in a query relationship data structure (RELSTRUCT) repository (210). For example, the RELSTRUCT repository 114 may be configured to store the various RELSTRUCTs generated by the RELSTRUCT generator 112.

Thus, RELSTRUCTs of the RELSTRUCT repository 114 generally represent data structures representing a manner and extent to which the MDX queries 104 are related to one another. For example, as described above, an MDX query may be broken into query parts, and the query parts may be explored for dependencies on, or relationships with, other query parts of other ones of the MDX queries 104. For example, similarities between query parts may include the same or similar names, syntax, structure, or text in two potentially related query parts. Thus, for example, with respect to a specific MDX query and an associated RELSTRUCT being constructed, it may be appreciated that individual query parts of the query in question may effectively be represented or replaced with one or more query parts from other, related MDX queries, which would cause the RELSTRUCT being constructed to provide an originally-desired query result.

In constructing RELSTRUCTs of the RELSTRUCT repository 114 in this manner, it may be appreciated that the RELSTRUCTs may thus be stored in a hierarchical fashion, since a given RELSTRUCT may have one or more child relationships with one or more other RELSTRUCTs, and/or may have one or more parent relationships with one or more other RELSTRUCTs. In some cases, it may occur that specific MDX queries are reached which are reused in other MDX queries/RELSTRUCTs (i.e., have a parent relationship with one or more RELSTRUCTs), but which does not itself reuse or contain reference to any other query part of any other MDX query. In other words, for example, such MDX queries may be understood to represent a leaf node of the type of hierarchical structure of RELSTRUCTs described above, and may be referred to herein as atomic queries.

From the above description, it may be appreciated that construction of the described hierarchical structure of the various RELSTRUCTs is useful in reducing or eliminating duplicates or other redundancies which may otherwise exist within the MDX queries 104. Such duplicates are not required, since each RELSTRUCT may be constructed as a combination of query parts (and/or including partial query results of execution of such query parts against the data source 108). Moreover, if desired, each RELSTRUCT may parameterize or otherwise specify a manner in which such combinations of query parts may be implemented.

Figure 3:
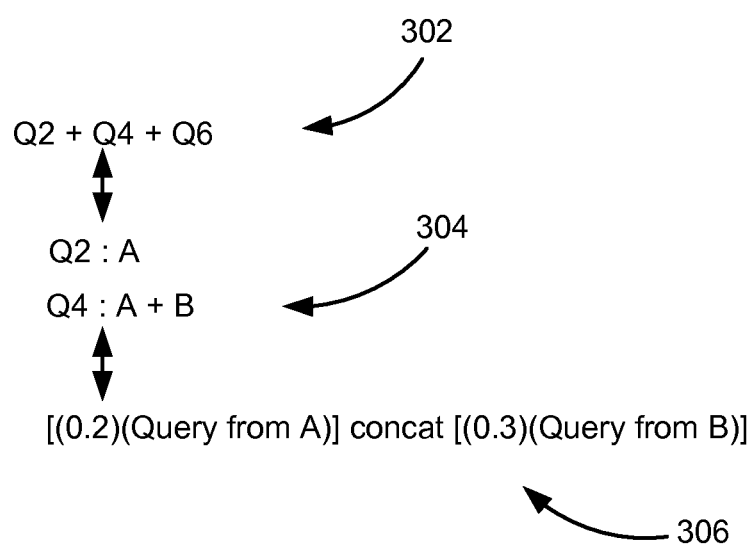
FIG. 3 is an example of a combined query obtained using the system of FIG. 1.

Thus, by way of example, pseudo code 1, as explained in detail below with respect to FIG. 3, represents an example data structure for a RELSTRUCT to be stored within the RELSTRUCT repository 114.

```
RELSTRUCT{
    relStructID:UID,
    originalMDX: STRING,
    CombinedQuery{
        ExternalPartsID:STRING,
        operator:STRING,
        parameter: STRING
    },
    ExternalQueryParts{
        Id:String,
        Sourceid:STRING
    }
}
```

As shown in the pseudo code above, each RELSTRUCT may include a RELSTRUCT ID, which represents a unique ID of the specific RELSTRUCT. In some examples, the RELSTRUCT may include the original MDX, which represents an original multi-dimensional query, which may be included as such in cases with the multi-dimensional query as atomic and no other query parts are available for replacement or reuse within the original MDX.

Otherwise, a combined query provides a substructure for creating an unlimited list of references to other RELSTRUCTs/queries. As shown, in the combined query, an external parts ID refers to an ID for referencing other RELSTRUCTs, so that the external parts ID may be used to combine the referenced RELSTRUCTs to obtain a new RELSTRUCT. The operator field refers to a dedicated operator for a desired combination of queries within the RELSTRUCT, while the parameter refers to a parameter specifying a manner in which combinations of the combined query should occur. Finally in the example pseudo code, an external query parts may be used to reference individually-identified query parts of the referenced, related MDX queries, which serve as the basis for inclusion of each such query within the combined query.

FIG. 3 illustrates an example query combination for a RELSTRUCT of the form referenced above in the example pseudo code. In FIG. 3, a combined query 302 includes IDs Q2, Q4, Q6, as well as a (+) operator. In the example, identifier Q2 references a query A, while identifier Q4 represents a query A+B, as shown in section 304 of FIG. 3.

Then, a resulting RELSTRUCT 306 combined query might be provided and parameterized, as shown, to include [(0.2)(query from A)]CONCAT[0.3)(query from B)]. In other words, the desired query result may be obtained by using underlying MDX queries A and B, using necessary operators and parameters to achieve the desired result. In the example, as shown, the parameterized query from query A is concatenated with the parameterized query from query B, where, as may be appreciated, the concatenation refers to the operator substructure of the RELSTRUCT of the above pseudo code.

Of course, various other operators may be used for the combination of given RELSTRUCT. For example, such operators may include multipliers, divisors, max/min operators, or percentages. Similarly, the parameter substructure may be implemented using any appropriate, dedicated parameter for combination of the RELSTRUCT in question, where such parameterization may be used to represent a measure of similarity or other relatedness between parts of the RELSTRUCT in question.

Figure 4:
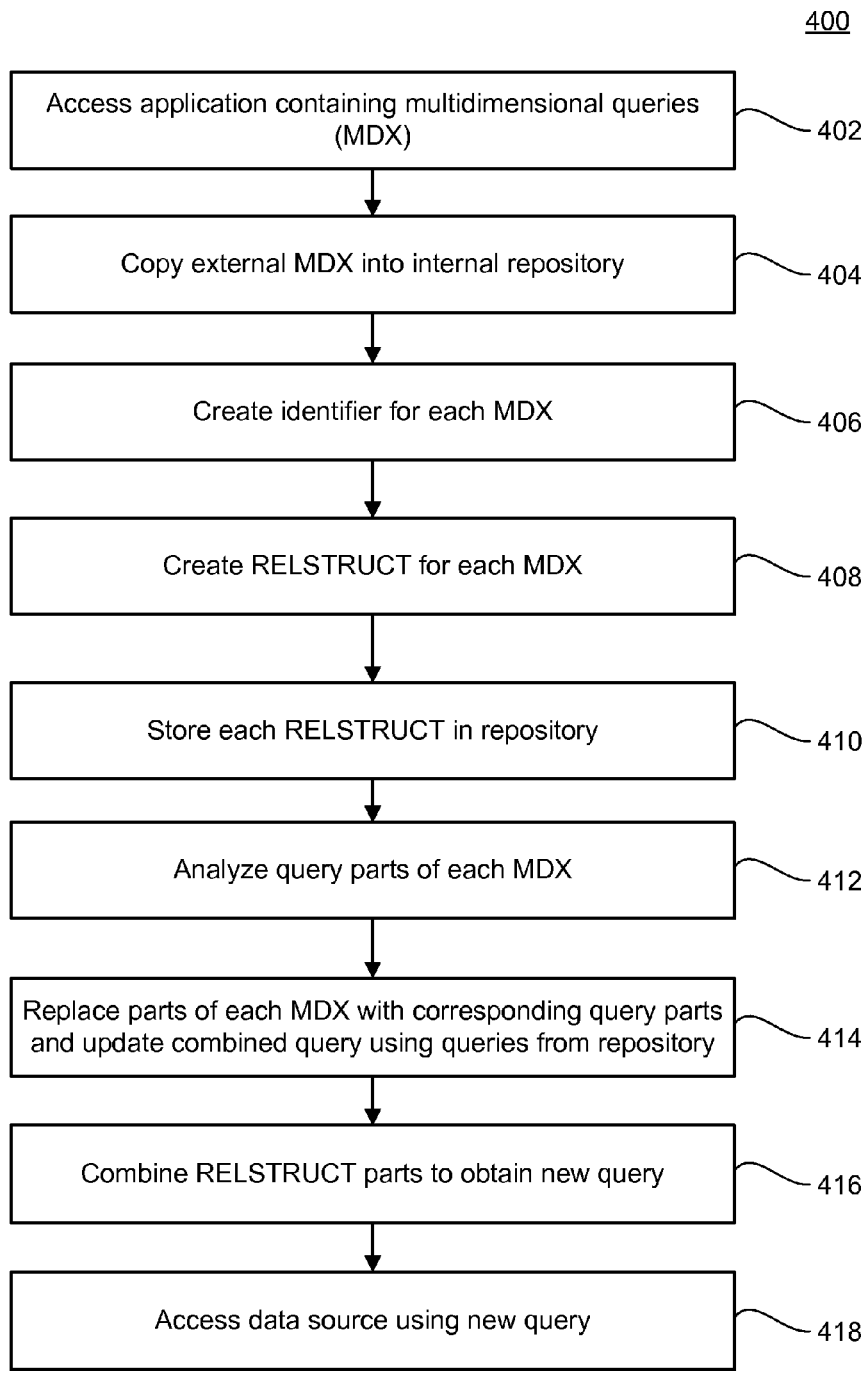
FIG. 4 is a flowchart illustrating more detailed example operations of the system of FIG. 1.

FIG. 4 is a flowchart 400 illustrating more detailed operations of the system of FIG. 1, with respect to construction of RELSTRUCTs of the form described above with respect to FIG. 3. In the example of FIG. 4, the RELSTRUCT generator 112 may act to access one or more applications containing multi-dimensional queries (402). The external MDX queries may then be copied into an internal repository (404), and an identifier for each MDX may be created (406).

Subsequently, a RELSTRUCT may be created for each MDX (408). That is, an instance of the data structure according to the above example pseudocode may be generated. Each RELSTRUCT may thus be stored in the RELSTRUCT repository 114 (410). At this point, further analysis of the various query parts of each MDX may be executed (412).

For example, as referenced above, each MDX query may be examined by the RELSTRUCT generator 112, e.g., the query analyzer 116, to identify included variables and/or operators, so that the MDX query may be broken into query parts. Each query part may sequentially be compared to other query parts of other MDX queries, until all the various relationships between the various query parts have been determined.

In example implementations, as also referenced, a measure of such similarity may be determined. For example, a weight indicating an extent of relatedness between two query parts may be assigned to each relationship between each pair of query parts. Such similarities may include similarities of content, e.g., the types of syntactical, semantic, or textual similarities in content referenced above, as well as various other types of relationships. For example, query parts may be determined to be similar with respect to respective metadata, common parts thereof, or temporal relationships between a creation and/or execution of the various query parts. Thus, the created RELSTRUCTs may include any appropriate combination of variables or values of the various queries or query parts.

Based on the determined similarities and relationships between the various query parts of each MDX query, identified query parts of each MDX query may be replaced with corresponding query parts of related MDX queries, so that the combined query of each RELSTRUCT may be updated accordingly (414). In other words, as described above, each RELSTRUCT may include replacements of query parts utilizing references to enable reuse of such query parts from other, related RELSTRUCTs/MDX queries. In this way, as described, a hierarchical graph of RELSTRUCTs may be constructed, in which query parts or whole queries may be reused by parent RELSTRUCTs, and in which atomic queries represent leaf nodes of the hierarchical structure (where, in such atomic queries, values other than the RELSTRUCT ID and original MDX ID would be null).

In some implementations, as described above with respect to FIG. 1, specified RELSTRUCT parts may be combined to effectively obtain a new query (416). For example, the query generator 120 may utilize query parts of one or more RELSTRUCTs of the RELSTRUCT repository 114. In this way, the access manager 122 may be enabled to access the data source 108, using an effective new query, executed using the specified query parts of the one or more relevant RELSTRUCTs (418).

FIGS. 5-11 illustrate example implementations and use cases for the system 100 of FIG. 1, in which complex dependency models are derived for visual support of KPI analysis. That is, as shown and described, FIGS. 5-11 illustrate examples in which the external application 110 is utilized to provide a visual representation of dependency models derived in conjunction with associated KPIs, and based on the types of query relationships described above with respect to FIGS. 1-4.

In the examples of FIGS. 5-11, and as referenced above, the external application 110 may represent a business warehouse system utilizing OLAP cubes, which may be analyzed using appropriate business intelligence tools. Such business intelligence tools may then create reports using the derived KPIs, where, for example, corresponding KPI calculations may be centrally and periodically executed.

Reports of related multi-dimensional items may be provided, for example, as two dimensional tables, or value-based dashboards. For example, conventional dashboards for KPIs typically show single items and unrelated KPIs, so that as more values are stored in a KPI analysis table, the tables become very complex. After a critical amount of KPIs is reached in conventional systems, the visualizations of the KPIs (e.g., tables or dashboards) may effectively lose some or all comprehensibility. Moreover, interdependencies between different KPIs are not visually represented in such conventional systems, and often may not exist within the system calculating the KPIs.

In the examples of FIGS. 5-11, a visualization of such KPIs may be provided in the form of a complex dependency graph, which may be created using KPI data extracted from a business warehouse. Using the RELSTRUCT data structures on related concepts described above, interdependencies between KPIs may be determined through the above-described analysis of available/relevant multi-dimensional queries. In this way, knowledge about interconnections between KPIs which are implicitly available within the corresponding MDX queries may be made visually apparent to a user of the system 100, thereby facilitating an accelerating decision-making process of such users. Moreover, the visualizations of such dependency graphs may be combined with visual perception support and enhanced interaction techniques, so that the user may more easily explore the illustrated connections between KPIs and their underlying MDX queries. As a result, for example, a cause of a state change of a specific KPI may be investigated, along with effects of such state changes on other KPIs.

Figure 5:
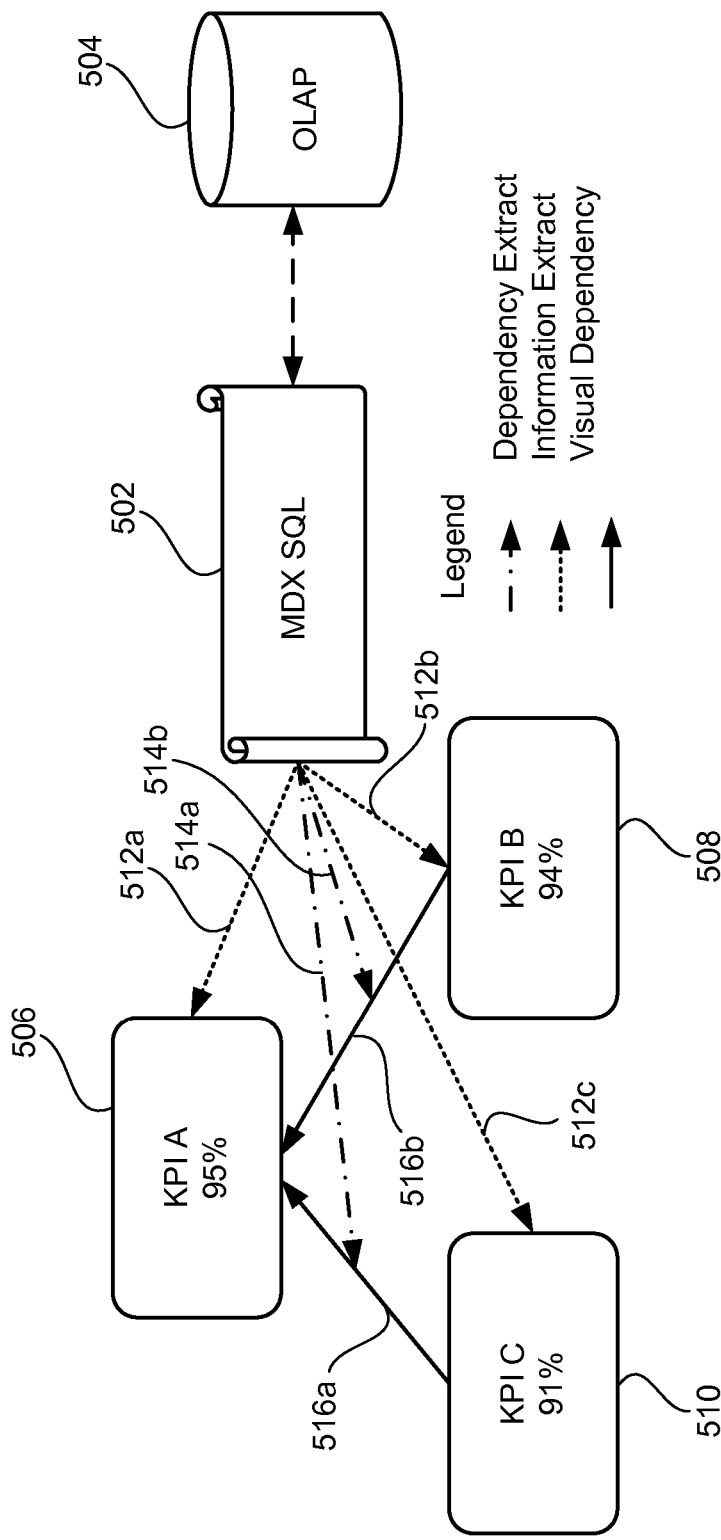
FIG. 5 is a block diagram of a query dependency graph created using the system of FIG. 1.
Figure 6:
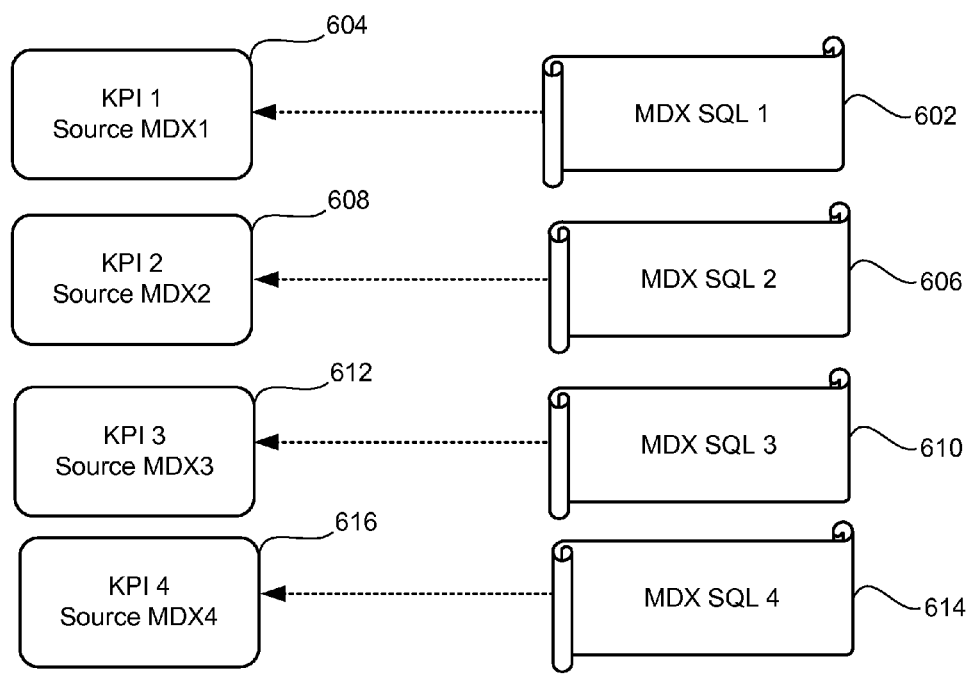
FIG. 6 is a block diagram of a first operation for creating the type of dependency model illustrated in FIG. 5.

In the example of FIG. 5, RELSTRUCTs 502 including MDX and/or SQL queries or query parts may be applied against an OLAP data source 504. In the example, as referenced above, a result of execution of such queries are corresponding KPIs 506, 508, 510. In example embodiments, one or more in-memory databases may be included among the OLAP data source(s) 504.

As may be appreciated from the above description, the RELSTRUCT 502 may be stored, e.g., within the RELSTRUCT repository 114, in a hierarchical manner. Consequently, it may be straightforward to extract dependencies 514A, 514B between the KPIs 506, 508, 510. That is, as shown, a dependency 516A is illustrated as a directed edge between the KPI node 510 and the KPI node 506, while a dependency 516B is represented by a corresponding edge between the KPI node 508 and the KPI node 506. As also shown, values for the various KPIs 506, 508, 510 may be extracted from corresponding portions of the RELSTRUCTs 502, as represented by corresponding arrows 512A, 512B, 512C. Thus, as shown, the visualization of FIG. 5 is provided in the form of a graph, in which nodes containing information are connected by edges, which may themselves contain additional information about an illustrated connection/relationship.

FIGS. 6-11 show more detailed examples of sequential operations that may be performed to obtain a dependency graph of the type illustrated in FIG. 5. Specifically, in FIG. 6, available queries 602, 606, 610, 614 may be bound to empty node templates 604, 608, 612, 616, respectively. Although not explicitly illustrated in the example of FIG. 6, it should be appreciated from the above description of FIGS. 1-4 that each, e.g., MDX query is associated with a corresponding RELSTRUCT, in a 1:1 relationship. As described in detail above, each such RELSTRUCT thus contains relationships of the relevant query with other available MDX queries.

Figure 7:
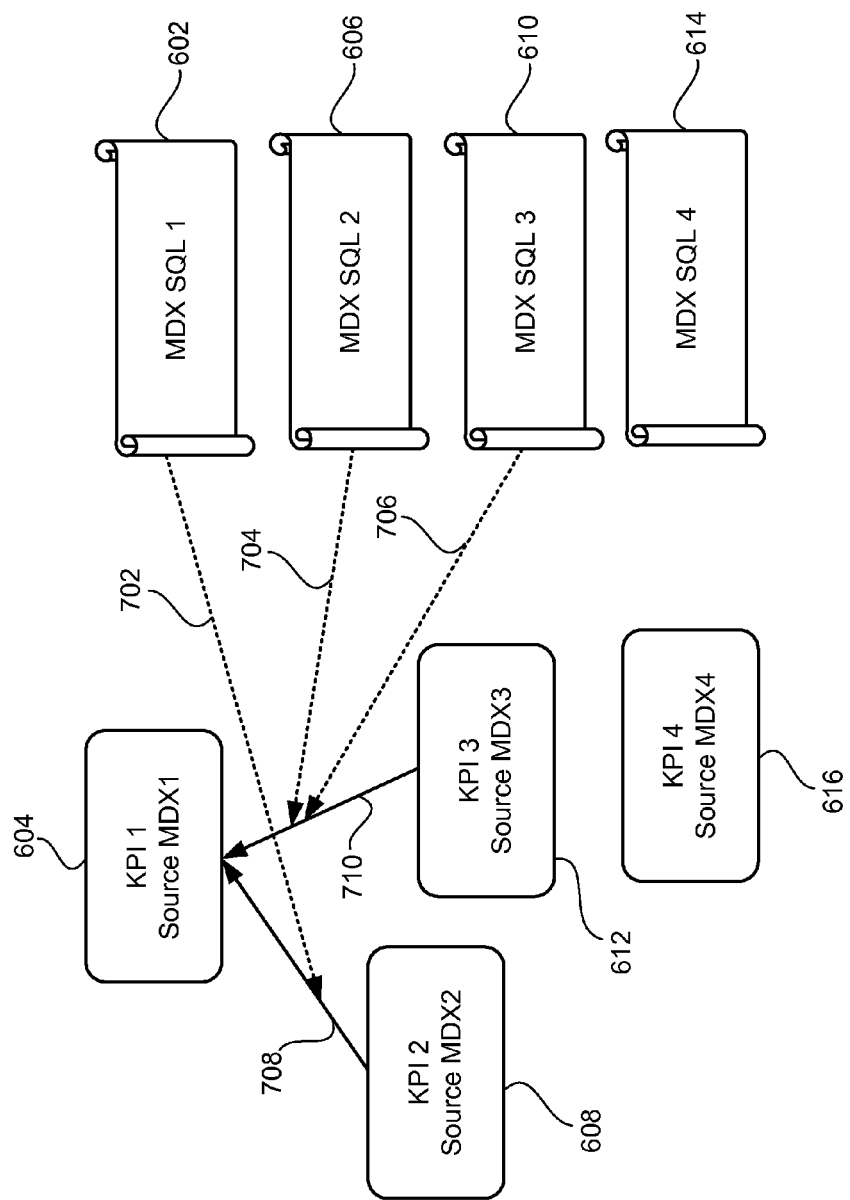
FIG. 7 is a block diagram of a second operation used to create the type of dependency model illustrated in FIG. 5.

Then, as shown in FIG. 7, the existence of the previously-determined RELSTRUCT may be used to determine, e.g., a dependency or relationship between the query 602 and a resulting connection between KPI 604 and KPI 608, as may be subsequently represented by a graph edge 708. Similarly, as shown by lines 704, 706, the queries 606, 610 may similarly be determined to be related to one another, and to imply a resulting dependency edge 710 between the KPI 612 and the KPI 604. For example, KPIs using the same or similar query parts, where such similar query parts may be understood to be included within corresponding RELSTRUCTs, may be understood to represent closely related KPIs. As may be appreciated from the above description of FIGS. 1-4, the availability of the RELSTRUCTs of the RELSTRUCT repository 114 makes determination of the dependency edges 708, 710 a straightforward process.

Figure 8:
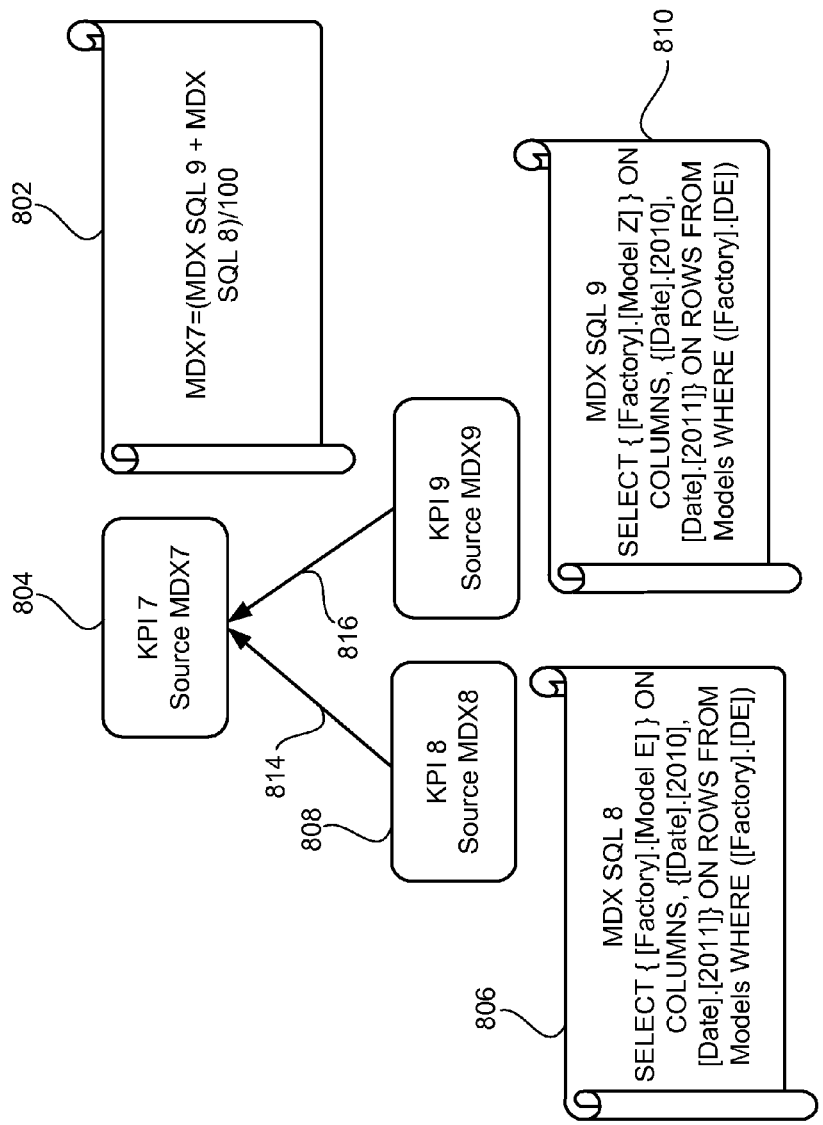
FIG. 8 is a block diagram of a query analysis executed using the system of FIG. 1.

FIG. 8 shows further example details with respect to determination of the types of dependency edges described above. As shown, FIG. 8 illustrates a multi-dimensional query and associated RELSTRUCT 802, in which a query MDX 7 of FIG. 8 is equivalent to a query (MDX SQL 9+MDX SQL 8) divided by 100, as shown. In other words, the RELSTRUCT 802 for the corresponding query MDX 7 of FIG. 8 would include the combined query just described and illustrated in FIG. 8. As shown, the MDX 7 query may result in, i.e., is a source of, a KPI 7, labeled in FIG. 8 with reference numeral 804. Similarly, a query MDX SQL 8 (and associated RELSTRUCT) 806 may be a source query for a KPI 8, labeled in FIG. 8 with reference numeral 808, while a query and associated RELSTRUCT MDX SQL 9, labeled with reference numeral 810, is a source for KPI 9, labeled with reference numeral 812.

As shown, and as just referenced, the query MDX 7 and associated RELSTRUCT, labeled with reference numeral 802, is a combined query that utilizes both the query 806 and the query 810, as would be represented in the corresponding RELSTRUCT for the query MDX 7. Consequently, dependency 814 between the KPI 8 node 808 and a dependency between the KPI 9 node 812 with the KPI 7 node 804 may easily be determined.

Figure 9:
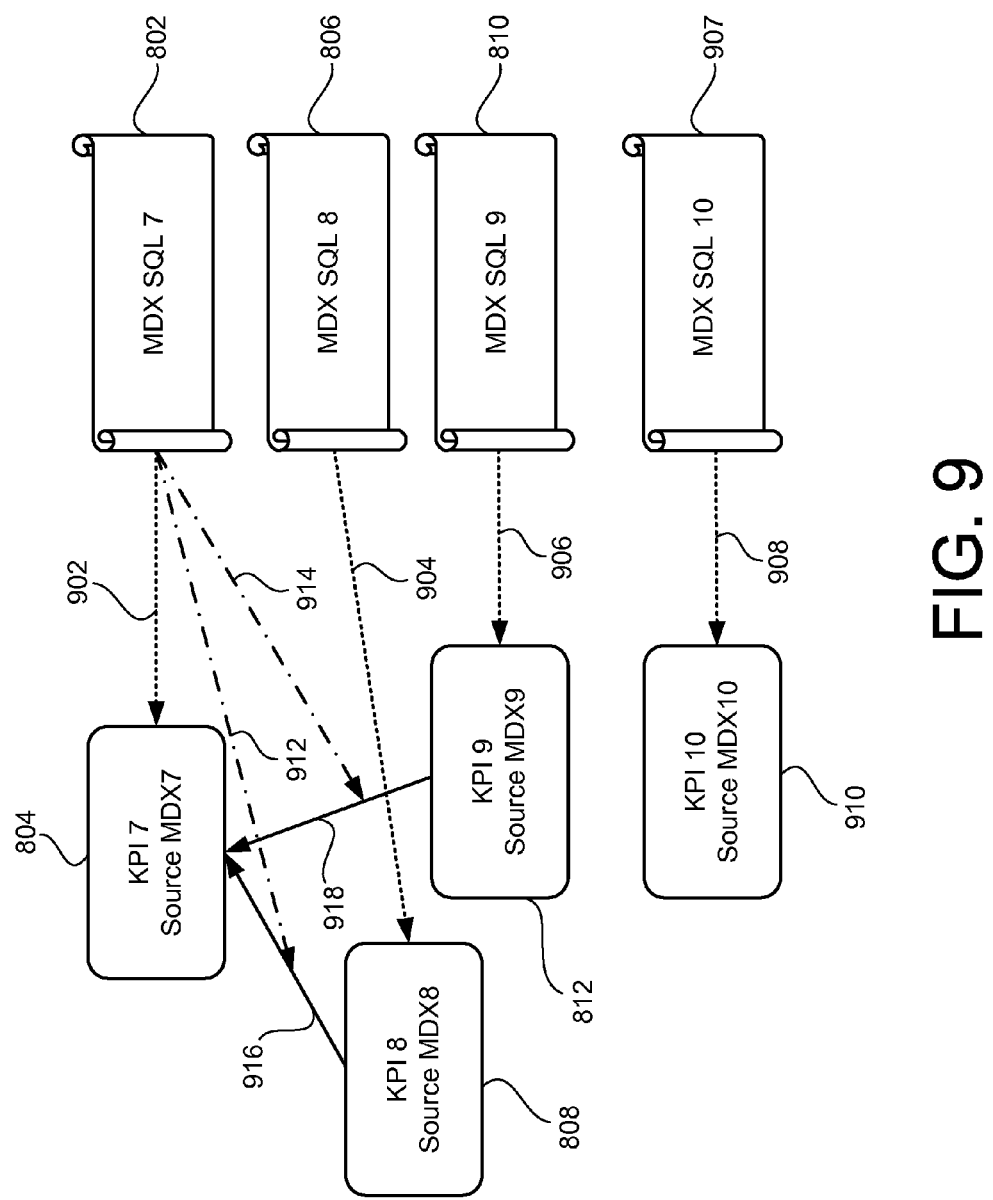
FIG. 9 is a block diagram of an operation used to create the type a dependency model for the query analysis of FIG. 8.

In FIG. 9, a resulting, created dependency model with KPI node templates 804, 808, 812, 910 may be presented to a user as being bound to corresponding queries 802, 806, 810, 907, as illustrated. That is, as shown, the query 802 is illustrated as being bound to the KPI node template 804 through line 902. The query 806 is illustrated as being bound to the KPI node template 808 through line 904. The query 810 is illustrated as being bound to the KPI node template 812 through line 906, and the query 907 is illustrated as being bound to the KPI node template 910 through line 908.

Figure 10:
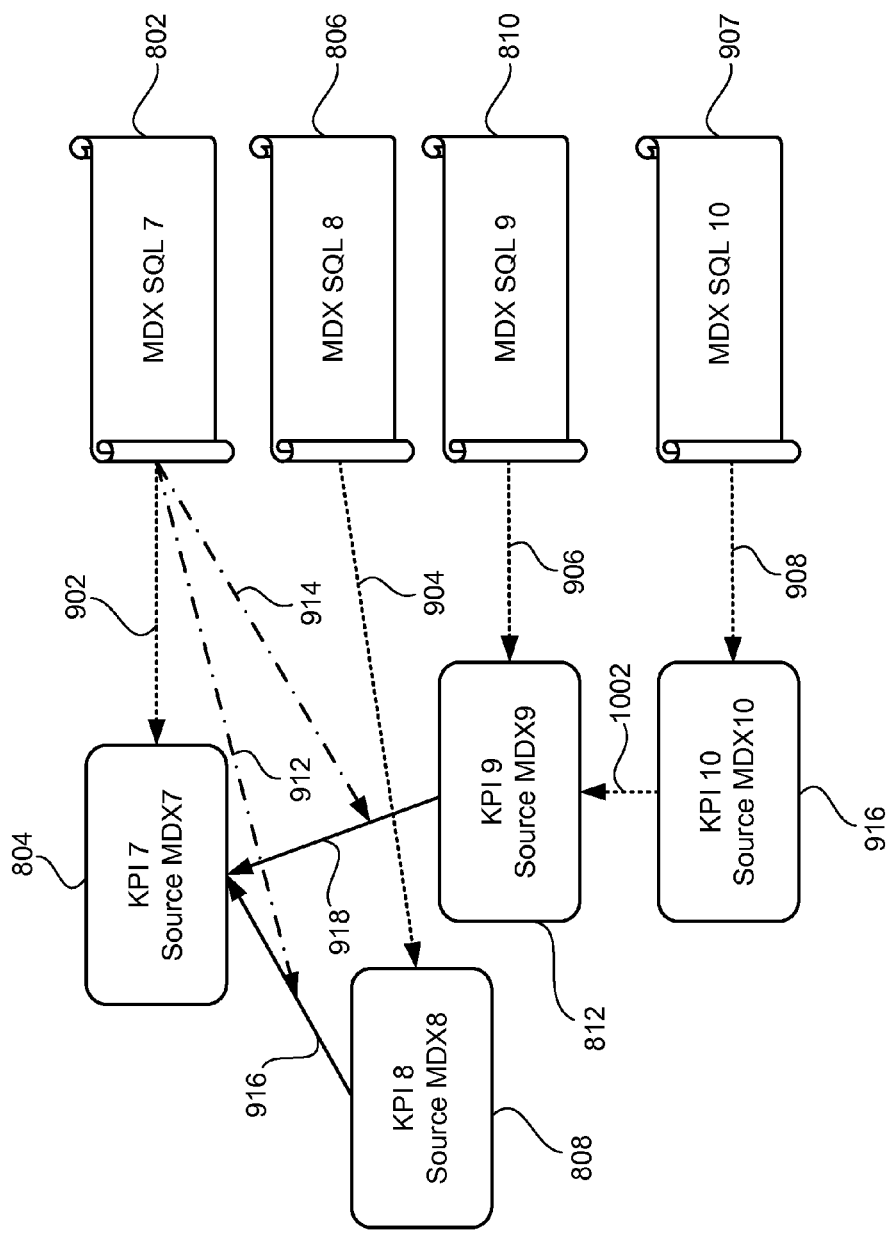
FIG. 10 is a block diagram of a dependency model of FIGS. 8 and 9, illustrating an example manual adjustment thereof.

At this stage, a user may influence and refine the illustrated dependency model. For example, the user may create different or additional connections, or may adjust an estimated weight of dependencies between KPI node templates. In some cases, it may occur that a KPI node template, such as the node template 910, may be bound to a query, such as the query 907, but having no connection to other KPIs/queries. As shown in FIG. 10, a user may be provided with an ability to include additional KPI connections, if desired. For example, a user may manually include a dependency edge 1002 between the KPI node template 910 and the KPI node template 912. In example scenarios, upon establishment of such connection between KPI node templates, corresponding, underlying RELSTRUCTs may be updated to reflect relationships between underlying queries of the thus-connected KPI nodes.

Figure 11:
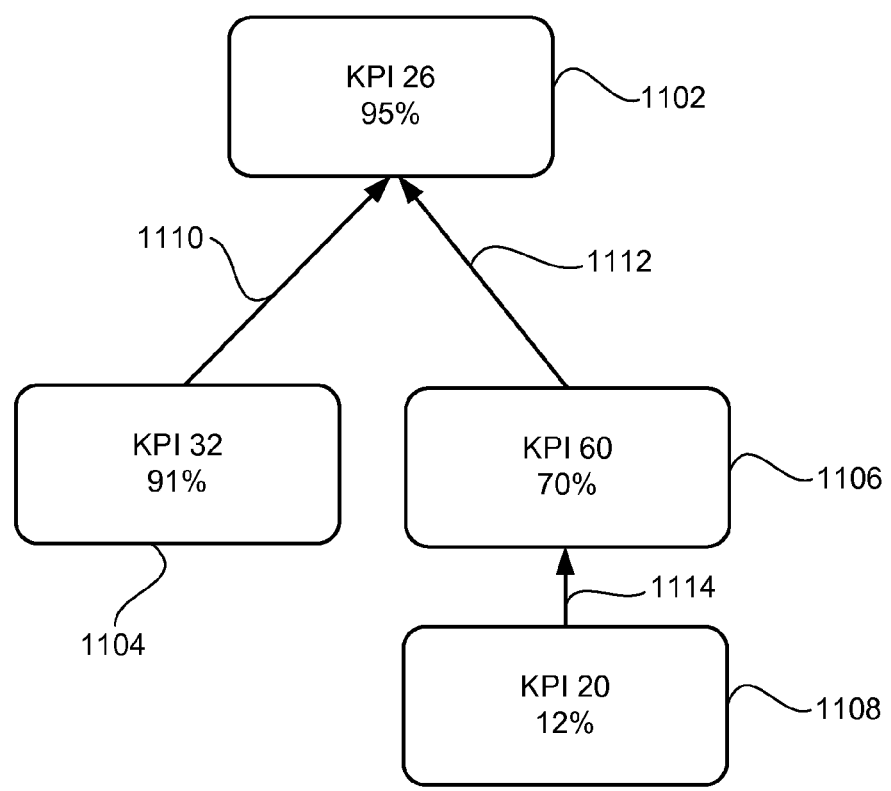
FIG. 11 is a block diagram of a resulting dependency model of FIG. 10, including calculated values.

Subsequently, as illustrated in FIG. 11, the underlying multi-dimensional queries, as part of their corresponding RELSTRUCTs, may be executed, so that the various node templates may be filled with actual results (e.g., KPI values) of the underlying MDX queries. That is, as shown, a node 1102 includes a 95% value for a KPI 26 while a KPI node 1104 illustrates a 91% value for a KPI 32, and a KPI node 1106 illustrates a 70% value for a KPI 60. Finally in FIG. 11, a KPI node 1108 illustrates a 12% value for a KPI 20. As shown, the KPI node 1104 is connected to the KPI node 1102 by a dependency edge 1110. The KPI node 1106 is connected to the KPI node 1102 by a dependency edge 1112, and the KPI node 1108 is connected to the KPI node 1106 by a dependency edge 1114.

Thus, as illustrated to the examples and use cases of FIGS. 5-11, the systems and methods of FIGS. 1-4 provide for a straightforward technique for making implicit, logical connections between KPIs into explicit, visual connections. As a result, a user may easily analyze KPI values and their interdependencies in a visual way, that may be used, for example, root cause analysis or what if analysis. The described approach thus provides a very intuitive visual representation of KPIs and relationships there between, thereby enabling relatively quicker decision-making. Of course, as also may be appreciated from the above descriptions of FIGS. 1-4, the graph-based representation of KPIs illustrated with respect to FIGS. 5-11 represents only a small subset of possible uses for the RELSTRUCT data structure and related techniques. As described, many other data analysis techniques may benefit from having knowledge of otherwise-unavailable relationships between queries.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A system including instructions recorded on a non-transitory computer-readable storage medium, and executable by at least one processor, the system comprising:

a query relationship data structure (RELSTRUCT) generator configured to cause the at least one processor to select a plurality of queries, each query structured for repeated application against a database to yield a query result that is updated over time with each repeated application, the RELSTRUCT generator including a query analyzer configured to cause the at least one processor to identify query parts of individual queries, and determine for each query, a relation, if any, of an included query part to any query part of remaining queries of the plurality of queries;

wherein the RELSTRUCT generator is further configured to cause the at least one processor to create, for each query, a query relationship data structure (RELSTRUCT) in which the query is related to at least one other query of the plurality of queries, based on the determined relation of a query part of the query and a query part of the at least one other query of the plurality of queries, and store the query relationship data structures in a query relationship data structure (RELSTRUCT) repository, and further wherein the RELSTRUCT generator is further configured to cause the at least one processor to calculate, for a first query and a second query of the plurality of queries, a dependency between a first query result and a second query result thereof, based on the determined relation between the query parts of the first query and the second query as determined from a corresponding RELSTRUCT, and visually display the first query result, the second query result, and the dependency therebetween, including maintaining the dependency with each repeated application of the first query and the second query, using the stored, corresponding RELSTRUCT, wherein the first query result includes a first Key Performance Indicator (KPI) representing a state or value for an entity in a business context, and the second query result includes a second KPI.

2. The system of claim 1, wherein the plurality of queries include a plurality of multi-dimensional queries.

3. The system of claim 1, wherein the relation between the included query part and any query part of remaining queries includes a similarity of content.

4. The system of claim 1, wherein the RELSTRUCT generator is further configured to cause the at least one processor to provide a measure of the relation between the included query part and any query part of remaining queries.

5. The system of claim 1, wherein the query relationship data structure for each corresponding query includes a combined query listing one or more references to other query relationship data structures and corresponding queries.

6. The system of claim 1, wherein the RELSTRUCT generator is configured to cause the at least one processor to store the query relationship data structures in the query relationship data structure (RELSTRUCT) repository in a hierarchical manner, in which at least some of the query relationship data structures are connected, in one or both of a parent or child relationship, to at least one other query relationship data structure.

7. The system of claim 6, wherein each query relationship data structure is applicable against the data source to obtain corresponding query results therefrom, and uses query relationship parts from query relationship data structures connected thereto in a child relationship, if any, to access the data source.

8. The system of claim 1, comprising
a query generator configured to cause the at least one processor to obtain a new query result including replacing a query of a selected query relationship data structure; and
an access manager configured to cause the at least one processor to apply the resulting query relationship data structure against the data source to obtain the new query result.

9. The system of claim 1, wherein query result relationships between the query results are determined, based on the relations between queries of the plurality of queries included within the query relationship data structures.

10. A computer-implemented method for executing instructions stored on a non-transitory computer readable storage medium, the method comprising:
selecting a plurality of queries, each query structured for repeated application against a database to yield a query result that is updated over time with each repeated application;
identifying query parts of individual queries;
determining for each query, a relation, if any, of an included query part to any query part of remaining queries of the plurality of queries;
creating, for each query, a query relationship data structure in which the query is related to at least one other query of the plurality of queries, based on the determined relation of a query part of the query and a query part of the at least one other query of the plurality of queries;
storing the query relationship data structures in a query relationship data structure (RELSTRUCT) repository;
calculating, for a first query and a second query of the plurality of queries, a dependency between a first query result and a second query result thereof, based on the determined relation between the query parts of the first query and the second query as determined from a corresponding RELSTRUCT; and
visually displaying the first query result, the second query result, and the dependency therebetween, including maintaining the dependency with each repeated application of the first query and the second query, using the stored, corresponding RELSTRUCT,
wherein the first query result includes a first Key Performance Indicator (KPI) representing a state or value for an entity in a business context, and the second query result includes a second KPI.

11. The method of claim 10, wherein the query relationship data structure for each corresponding query includes a combined query listing one or more references to other query relationship data structures and corresponding queries.

12. The method of claim 10, wherein the storing the query relationship data structures in the query relationship data structure (RELSTRUCT) repository includes storing the query relationship data structures in the query relationship data structure (RELSTRUCT) repository in a hierarchical manner, in which at least some of the query relationship data structures are connected, in one or both of a parent or child relationship, to at least one other query relationship data structure.

13. The method of claim 12, wherein each query relationship data structure is applicable against the data source to obtain corresponding query results therefrom, and uses query relationship parts from query relationship data structures connected thereto in a child relationship, if any, to access the data source.

14. The method of claim 10, comprising
causing the at least one processor to obtain a new query result including replacing a query of a selected query relationship data structure; and
applying the resulting query relationship data structure against the data source to obtain the new query result.

15. A computer program product, the computer program product being tangibly embodied on a non-transitory computer-readable storage medium and comprising instructions that, when executed, are configured to:
select a plurality of queries, each query structured for repeated application against a database to yield a query result that is updated over time with each repeated application;
identify query parts of individual queries;
determine for each query, a relation, if any, of an included query part to any query part of remaining queries of the plurality of queries;
create, for each query, a query relationship data structure in which the query is related to at least one other query of the plurality of queries, based on the determined relation of a query part of the query and a query part of the at least one other query of the plurality of queries;
store the query relationship data structures in a query relationship data structure (RELSTRUCT) repository;
calculate, for a first query and a second query of the plurality of queries, a dependency between a first query result and a second query result thereof, based on the determined relation between the query parts of the first query and the second query as determined from a corresponding RELSTRUCT; and
visually display the first query result, the second query result, and the dependency therebetween, including maintaining the dependency with each repeated application of the first query and the second query, using the stored, corresponding RELSTRUCT,
wherein the first query result includes a first Key Performance Indicator (KPI) representing a state or value for an entity in a business context, and the second query result includes a second KPI.

16. The computer program product of claim 15, wherein the query relationship data structure for each corresponding query includes a combined query listing one or more references to other query relationship data structures and corresponding queries.

17. The computer program product of claim 15, wherein the instructions, when executed, are further configured to cause the at least one processor to store the query relationship data structures in the query relationship data structure (RELSTRUCT) repository in a hierarchical manner, in which at least some of the query relationship data structures are connected, in one or both of a parent or child relationship, to at least one other query relationship data structure.

18. The computer program product of claim 15, wherein the instructions, when executed, are further configured to cause the at least one processor to:
obtain a new query result including replacing a query of a selected query relationship data structure; and
apply the resulting query relationship data structure against the data source to obtain the new query result.

19. The computer program product of claim 15, wherein query result relationships between the query results are determined, based on the relations between queries of the plurality of queries included within the query relationship data structures.

* * * * *